United States Patent [19]

Robert

[11] Patent Number: 5,052,981
[45] Date of Patent: Oct. 1, 1991

[54] VARIABLE DIAMETER PULLEY WITH CENTRIFUGAL WEIGHTS

[75] Inventor: Jean Robert, Granby, Canada

[73] Assignee: Powerbloc Ibc Canada, Inc., Canada

[21] Appl. No.: 503,892

[22] Filed: Apr. 4, 1990

[51] Int. Cl.⁵ ............................................. F16H 61/00
[52] U.S. Cl. ......................................... 474/14; 474/15; 474/25
[58] Field of Search ..................... 474/11-15, 474/25, 28

[56] References Cited

U.S. PATENT DOCUMENTS

| | | | |
|---|---|---|---|
| 2,378,549 | 6/1945 | Gruenhagen | 474/14 |
| 2,512,816 | 6/1950 | Sweger | 474/14 X |
| 2,556,512 | 6/1951 | Ammon | 474/14 |
| 3,230,787 | 1/1966 | Siegal | 474/14 |
| 3,648,532 | 3/1972 | Vallieres | 474/14 |
| 3,659,470 | 5/1972 | Beaudoin | 474/13 |
| 3,850,050 | 11/1974 | Lemmens | 474/12 X |
| 4,575,363 | 3/1986 | Burgess et al. | 474/14 |
| 4,589,858 | 5/1986 | Gaddi | 474/12 |

Primary Examiner—Ramon S. Britts
Assistant Examiner—Roger J. Schoeppel
Attorney, Agent, or Firm—Bacon & Thomas

[57] ABSTRACT

In a variable speed transmission of the pulley type, one of the pulley cheeks is movable axially with respect to the other which is stationary. The movable cheek faces a reaction cup which is solid with the stationary cheek. The cup and the movable cheek are formed with converging cam surfaces which define between them a chamber into which are disposed centrifugal weights having ends sliding on the cam surfaces. When the pulley and reaction cup rotate, the weights are thrown outward and force the movable cheek toward the stationary one. According to the invention, the cam surface of the reaction cup is concave, having a radius of curvature of predetermined length. On the other hand, the end edges of the centrifugal weights slidable on the cam surface of the reaction cup are convex and have a radius of curvature shorter than said predetermined length so that the ends of the weights bear only on a limited part of the cam surface of the reaction cup.

14 Claims, 6 Drawing Sheets

VARIABLE DIAMETER PULLEY WITH CENTRIFUGAL WEIGHTS

BACKGROUND OF THE INVENTION

1. Field of the Invention

The present invention relates generally to a variable speed transmission of the belt-pulley type wherein the V groove of the driving pulley is capable of varying in width to increase or decrease the speed of the driven pulley, connected to the driving pulley by the belt, by displacement of the latter in the V groove.

2. Description of the Prior Art

In a variable speed transmission of the above general type, as used on snowmobiles, motorcycles and other like utilitarian or recreational vehicles, the pulley comprises a pair of V groove-defining cheeks rotatable in unison about a common axis and of which one is axially stationary while the other is axially movable. Located on the side of the pulley away from the stationary cheek is a reaction cup which is also axially stationary by being made solid with the said stationary cheek, for instance. The movable cheek and the reaction cup are formed with conical cam surfaces converging toward one another and defining between them a chamber into which are housed a set of centrifugal weights having the shape of an isosceles trapezium in cross-section. The weights are free to move radially away from the common axis and are slidable along their conical cam surfaces. As the centrifugal force of the weights increases with increasing speed of the driving pulley, driven by the motor, the weights move radially outward and force the movable cheek toward the stationary one to narrow the V groove between them, causing the belt to climb in the groove thereby increasing the speed of rotation of the driven pulley or, more generally, varying the speed ratio between the driving and driven cheeks.

The generating lines of the conical cam surfaces being rectilinear, the spreading movement of the cheeks is proportional to the radial displacement of the centrifugal weights.

The best prior art reference known to Applicant, with respect to his invention, is French patent application No. 2,504,635, in the name of Carnot and published on Oct. 29, 1982. In this application, the centrifugal weights used are in the form of spheres providing a pin-point contact between the spheres and the cam surface of the reaction cup. In Applicant's transmission, the improved centrifugal weights and reaction cup are shaped to provide surface contact between them resulting in reduced and more evenly distributed wear, as will be seen hereinafter. Moreover, in the Carnot application, the contact point between the spheres and the cam surface is always at the same distance from the center of gravity of the spheres, because of their shape. In Applicant's transmission, the distance between the contact point of the weights and their center of gravity varies as a function of the position of these weights. As a result, the resultant of the forces applied by the weights onto the cam surface also varies and may be selected to meet some specific requirement (e.g. clutch response).

Other patents known to Applicant are:
U.S. Pat. Nos.:
2,378,549
2,512,816
3,230,787
3,850,050

SUMMARY OF THE INVENTION

An important object of the invention lies in a pulley-type transmission wherein use is made of freely displaceable centrifugal weights capable of reducing friction losses in the mechanism as a whole.

Another important object is in the provision of a transmission of the above type wherein blocks are used which are molded to the shapes of the sliding planes, for centrifugal weights, offering a better distribution of the forces acting between the components of the transmission.

Another object of the present invention is to provide a pulley-type transmission wherein the cooperating cam surfaces on the reaction cup and on the centrifugal weights are designed to cause optimization of the displacement of the belt in the V groove with respect to the speed of the motor when the latter runs at cruising speed.

From a practical point of view, the above object is to obtain that the vehicle run faster for a given motor RPM located between starting up and full speed. In other words, at medium speed, the motor would run more slowly for the same efficiency and would, consequently, wear off less rapidly and be proportionately more silent.

The above object is made possible, according to the invention, by making the cam surface of the reaction cup concave, with respect to the rotation axis of the pulley, while making convex at least a portion of the end edges of the centrifugal weights riding on the concave cam surface of the cup; the radius of curvature of the convex end edges being smaller than that of the concave reaction cup. The end edges may be made convex along the full radial thickness of the weights or else may be provided, at their center, with round protuberances or bulges.

Further objects and other advantages of the invention will become apparent from the description that follows of preferred embodiment having reference to the appended drawings.

DESCRIPTION OF THE PREFERRED EMBODIMENT

Figure 1:
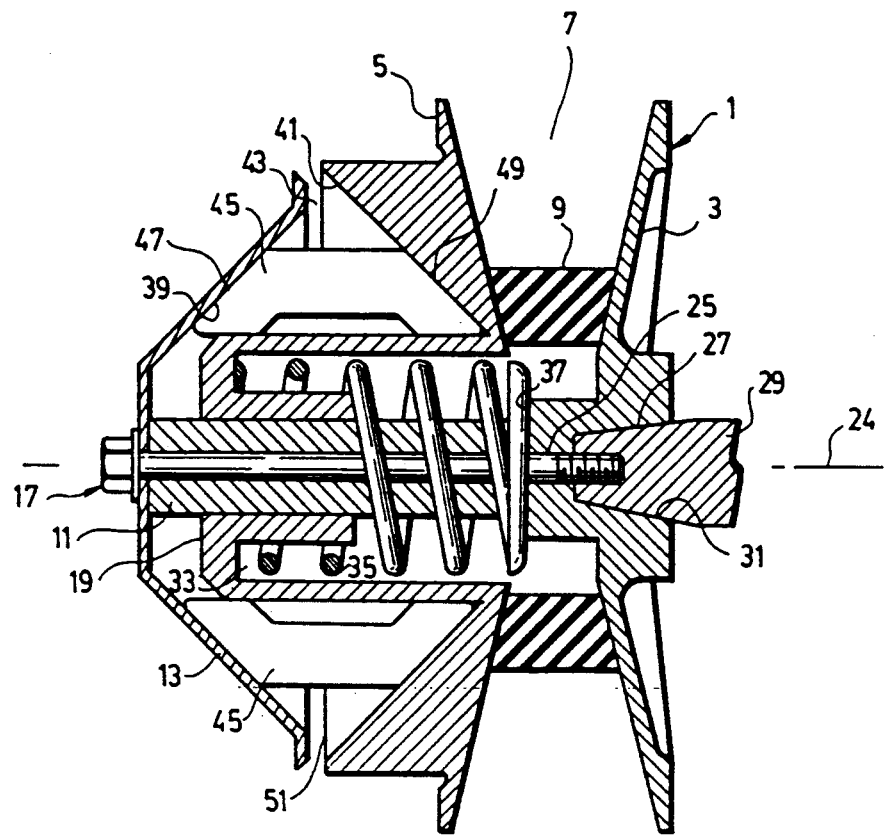
FIG. 1 is an axial cross section of a pulley-type transmission making use of known centrifugal weights.

The transmissions shown in FIG. 1, on the one hand and FIGS. 2 and 3 on the other hand, are basically the same, being constructed as follows.

The pulley 1 comprises an outer axially stationary cheek 3 driven by a motor (not shown) and an inner axially movable cheek 5 rotatable in unison about a common axis and defining between them a V groove 7 into which is received a flexible drive belt 9. The cheek 5 is freely mounted through axial bearings 21 onto an axial tubular central hub 11 having one end 27 passing through a hole 31 provided at the center of the cheek 3. A bolt 25 integrally extends the other free end of the hub 11. A reaction cup 13 (FIG. 1) or 15 (FIGS. 2 and 3) is removably secured to the hub 11 by means of a nut and lock washer assembly 17 screwed onto the bolt 25. The one end 27 or the hub 11 is rigidly fixed into the hole 31 of the cheek and retained by a stop plate 29. By this connection, the cup 13 or 15 is made solid and rotatable in unison with the cheek 3.

A sleeve 19 integral with cheek 5 is mounted over the hub 11. The sleeve 19 which is coaxial with the hub 1L extends at the center of the cheek 5.

A plug 23 is screwed onto the free end of the sleeve 19. This plug, which is free to rotate relative to the hub due to an axial bearing 26, is shaped to define an annular blind bore 33 into which is received one end of a coil spring 35 mounted about the hub 11 inside the sleeve 19. One end of the coil spring 35 bears against the bottom of the bore while its other end bears against a radial shoulder 37 held by a flange 38 attached to the hub 11. The spring 35 is intended to resist cheek 5 from closing in on cheek 3, as can be gathered from FIGS. 2 and 3.

The reaction cup 13 and the movable cheek 5, in FIG. 1, are formed with frusto-conical cams surfaces 39, 41, of equal inclination, extending around the axis 24 and converging toward one another to define a chamber 43 between them. A set of at least two centrifugal inertia weights 45, having the shape of an elongated isosceles trapezium in cross-section, are housed in this chamber and are seized so that their end edges 47, 49 are constantly flatly applied against their respective cam surfaces 39, 41, by the bias of the spring 35.

With the above arrangement in mind and as the driving pulley 3 picks up speed, through its attachment to the stub shaft 29, the centrifugal weights 45 are thrown outward in the chamber 43 forcing the movable cheek 5 rightward and climbing of the belt 9 in the groove 7. The generating lines of the cam surfaces 39, 41, being rectilinear, movement of the cheek 5 is proportional to the radial displacement of the weights 45.

Figure 4:
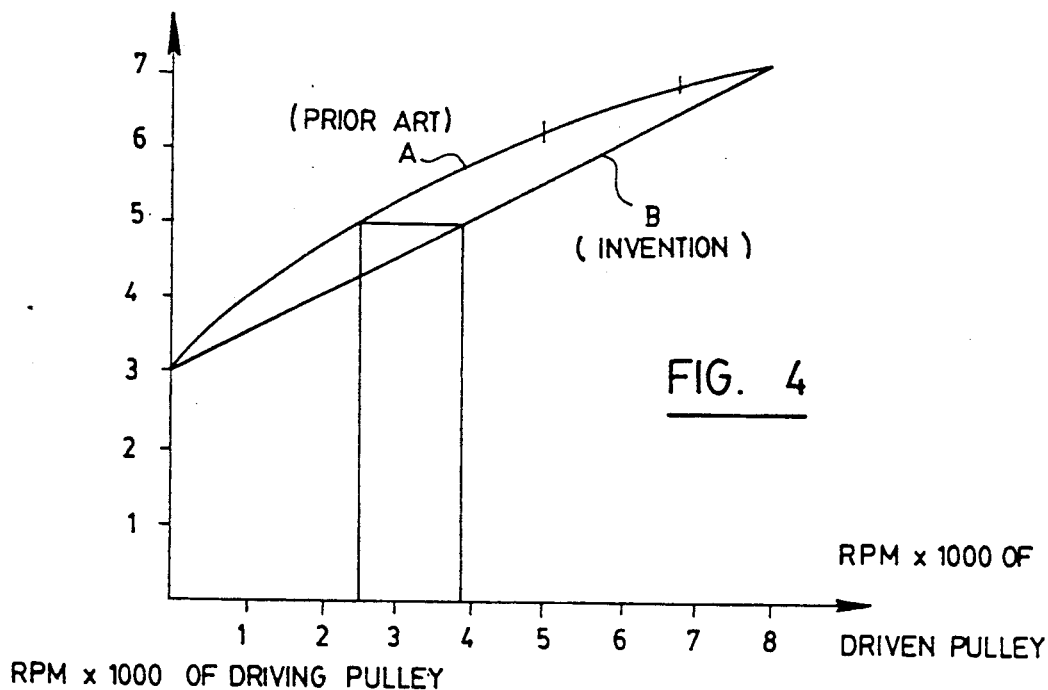
FIG. 4 is a graph showing the speed curves corresponding to the driving pulley and to the driven pulley in transmissions using a known centrifugal weights arrangement and a transmission using a centrifugal weights arrangement according to the invention.

The curve A in FIG. 4 shows the stabilized RPM of the driven pulley for different RPM's of the driving pulley. When use is made of the prior art transmission shown in FIG. 1, it is seen that the curve bends first slightly upwards as the speed of the motor increases and then tapers off as the motor speeds reaches its maximum.

In order to guide the weights 45, properly, in their radial displacement, they are made to slide freely in guide channels defined by pairs of parallel spaced ribs 51 projecting perpendicularly from the cam surface 41 of the movable cheek 5.

Figure 2:
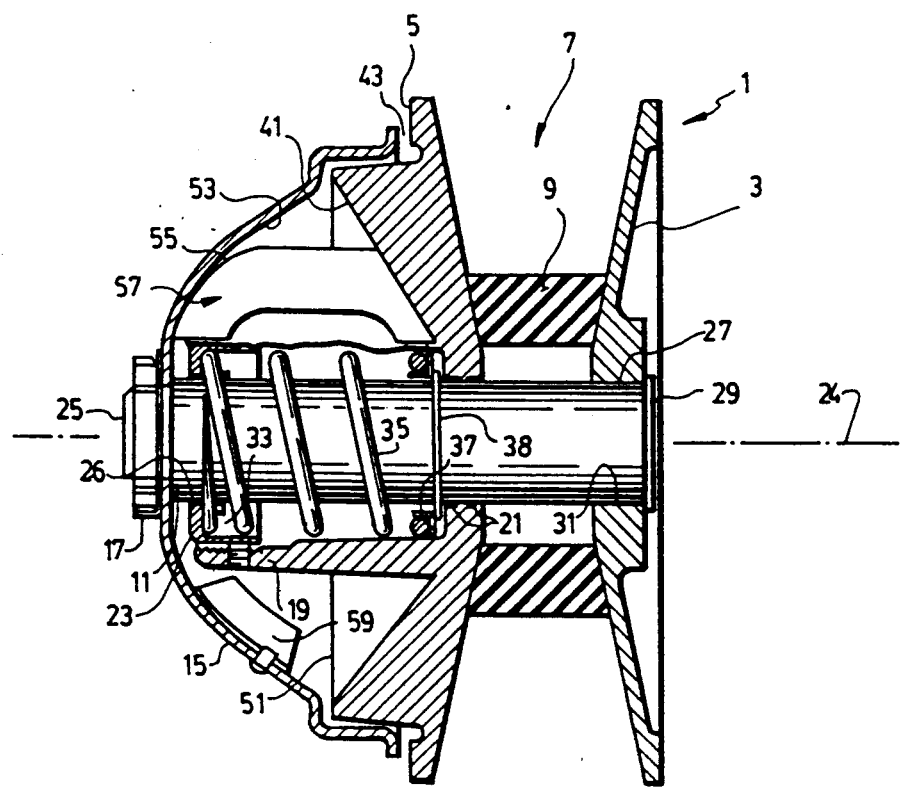
FIG. 2 is an axial cross section of a pulley-type belt transmission making use of a centrifugal weights and reaction cup arrangement made according to the teaching of the invention; the transmission being in starting-up position.
Figure 3:
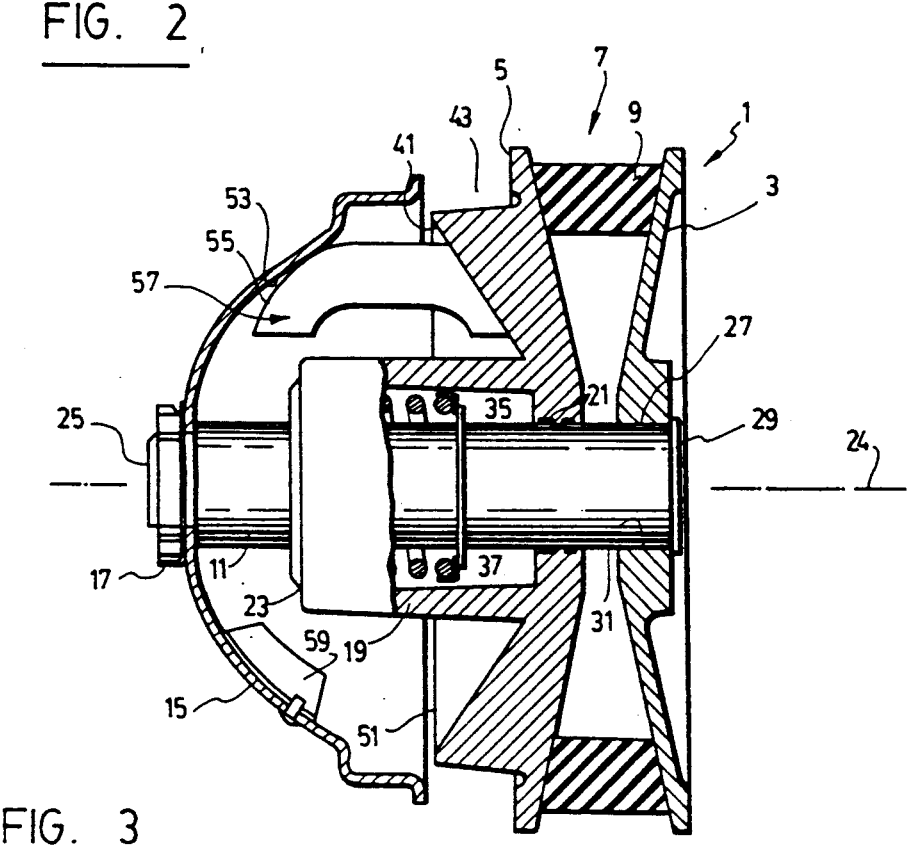
FIG. 3 is a view like that of FIG. 2 but with the transmission being at running speed.

FIGS. 2 and 3 show the basic improvement of the invention as applied to essentially the same pulley structure 1 as in FIG. 1.

According to the improved arrangement, the cam surface 53 of the axially stationary modified reaction cup 15 is concave with respect to the common axis 24 while the end edges 55 of the modified centrifugal inertia blocks or weights 57 are convex on at least a portion of their radial thickness. According to the invention, the radius of curvature of the cam surface 53 of the reaction cup is longer than that of the convex portion of the weights 57 so that the latter bear on the surface 53 along a very limited length thereof.

Preferably, the end edges 55 are convex along the full radial thickness of the weights 57 but the convex portion may also be in the form of rounded protuberances or bulges at the center of the end edges.

It will be noted that the opposite end edges 49 of the weights and the cooperating cam surface 41 of the movable cheek 5 have the same configuration as in the pulley structure of FIG. 1.

If desired, rims 59 may be fixed by rivet or otherwise to the cup 15, to keep the weights equally distributed in channels all around the cup and guide these weights during their radial displacement.

Figure 5:
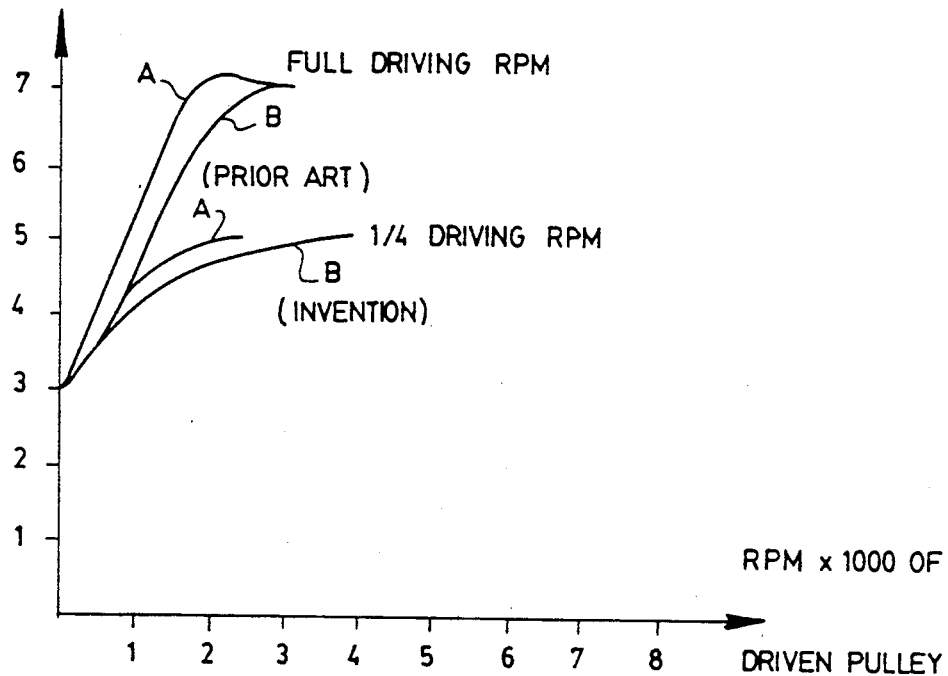
FIG. 5 is a graph showing the acceleration curves from starting up of the driven pulley to, respectively, one quarter and full RPM of the driving pulley, in a known centrifugal weights arrangement and a centrifugal weights arrangement according to the invention.

The results of tests carried with the improved transmission of FIGS. 2 and 3 is illustrated by curves B, in FIGS. 4 and 5. These figures show that the RPM of the driven pulley is directly proportional to that of the motor or driving pulley. It follows that for a given speed of the motor, the driven pulley runs faster when a curved cam and curved weight edges are used; the latter having a lesser radius of curvature.

From the acceleration curves in FIG. 5, plotted from starting-up of the driven pulley to, respectively, one fourth RPM and full RPM of the motor, it is seen that the improved transmission makes it possible to use the full power of the motor when the latter runs at full speed.

The tests have also shown that, with the improved clutch transmission and after several hours of operation, there was hardly any change in the coefficient of friction between the curved components.

The cam surface of the reaction cup must be given a concave shape such that it tends to stabilize the resultant of the forces acting on the driving belt. There is a precise shape for each type of motor (diesel, gasoline, electric ... etc). The calculations that follow resume the mathematical developments that make it possible to design a proper reaction cup capable of stabilizing the resultant of the forces acting on the driving belt.

Figure 6A:
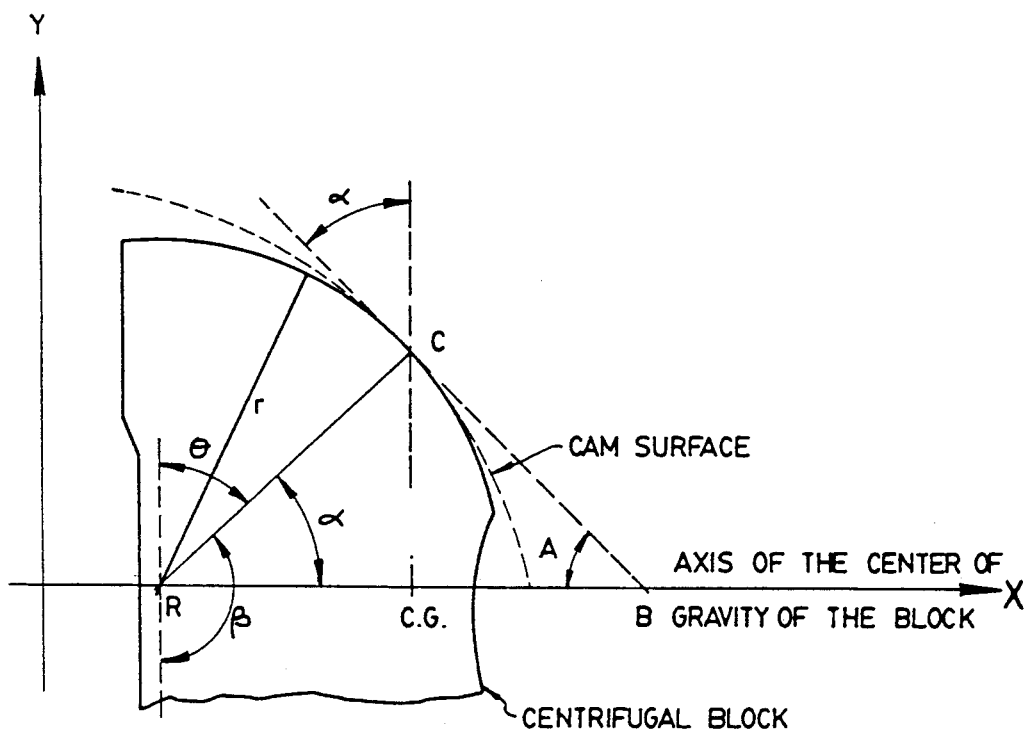
FIGS. 6a to 6c are diagrams showing the portion of the contact points and the various forces acting on the centrifugal block, in use.

Reference is now made to FIG. 6a in order to establish from the following mathematical developments, the position of the contact point C between the centrifugal block and the cam surface, with respect to the center of gravity of the block.

List of variables:
C: Point of contact between the centrifugal block and the cup.
C.G.: Center of gravity of the centrifugal block.
R: Center of the radius of curvature of the block.
r: Radius of curvature of the block.
α: Angle at the point of contact C.

$$\beta: \frac{\pi}{2} + \alpha$$

1. Equation of the circle of center R, as a function r, α, $$x^2 + y^2 = r^2$$

$$x = r \cos \alpha + x_R$$

$$y = r \sin \alpha + y_R$$

2. Equation of the tangent at C;

equation of the type $Y_1 = Ax_1 + B$ where A is the slope of the tangent and B the point of intersection of the tangent with the axis of the center of gravity of the block.

$$A = -tg\, \alpha$$

$$B = y + x \cot g\, \alpha$$

$$y_1 = -x_1 tg\alpha + y + x \cot g\, \alpha$$

3. Equation of the point of contact C as a function of the position of the radius of the block and of the angle of contact $$y_C = = x_C tg\alpha + r \sin \alpha + Y_R + \cot g\, \alpha(r \cos \alpha + x_R)$$

4. Equation of the point of contact C with respect to the center of gravity of the block, $$y_R = y_{CG} - y_{RCG}$$

where: $y_{RCG}$ is the distance in y between the position of the radius and of the center of gravity $$x_R = x_{CG} - x_{RCG}$$

where: $x_{RCG}$ is the distance in x between the position of the radius and of the center of gravity.

$$y_C = -x_C tg\alpha + r \sin \alpha + y_{CG} - Y_{RCG} + \cot g\, \alpha(r \cos \alpha + x_{CG} - x_{RCG})$$

Figure 6B:
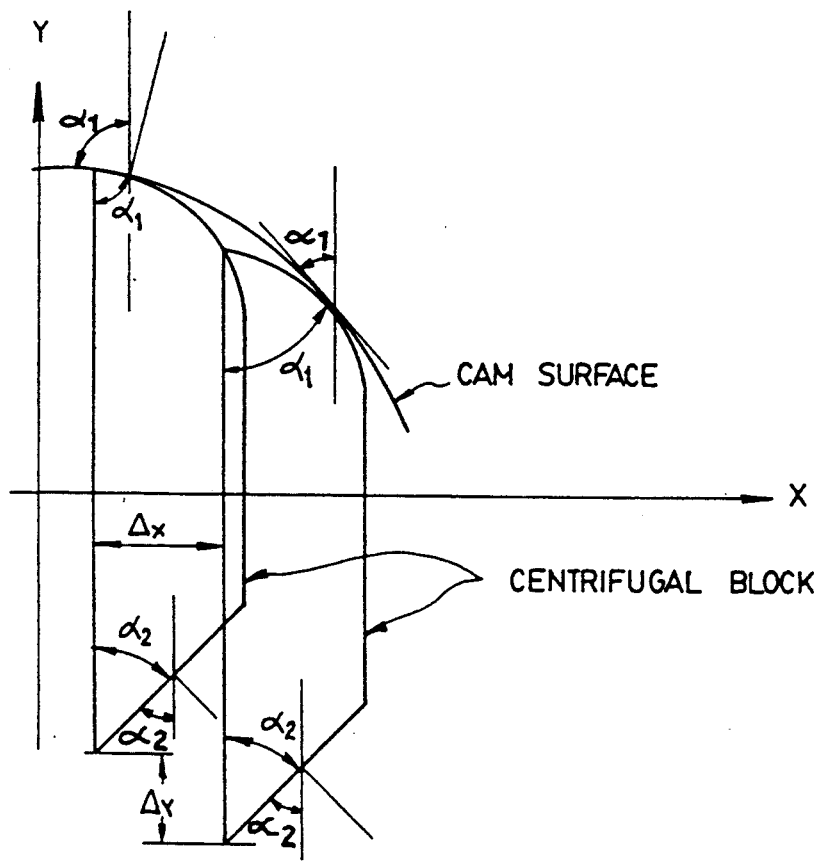

FIG. 6b gives a geometrical study of the centrifugal block from which may be drawn the following mathematical relations.

$$\Delta y = \frac{\Delta x}{tg\alpha_1} + \frac{\Delta x}{tg\alpha_2} = \Delta X \left( \frac{1}{tg\alpha_1} + \frac{1}{tg\alpha_2} \right)$$

$$\Delta x = \frac{1}{\left( \frac{1}{tg\alpha_1} + \frac{1}{tg\alpha_2} \right)} \Delta y$$

$$\frac{1}{tg\alpha_1} = \frac{1}{\Delta x / \Delta y} - \frac{1}{tg\alpha_2}$$

$$tg\alpha_1 = \frac{1}{\frac{1}{\Delta x / \Delta y} - \frac{1}{tg\alpha_2}}$$

$$\alpha_1 = tg^{-1} \left( \frac{1}{\frac{\Delta y}{\Delta x} - \frac{1}{tg\alpha_2}} \right)$$

where:

$\alpha_1$ is the complementary angle of the perpendicular at the point of contact between the block and the cam surface of the reaction cup;

$\alpha_2$ is the complementary angle of the perpendicular at the point of contact between the block and the inclined plane (fixed angle);

$$\frac{\Delta y}{\Delta x}$$

is the variation in the position of the center of gravity as a function of the speed of rotation of the motor.

Figure 6C:
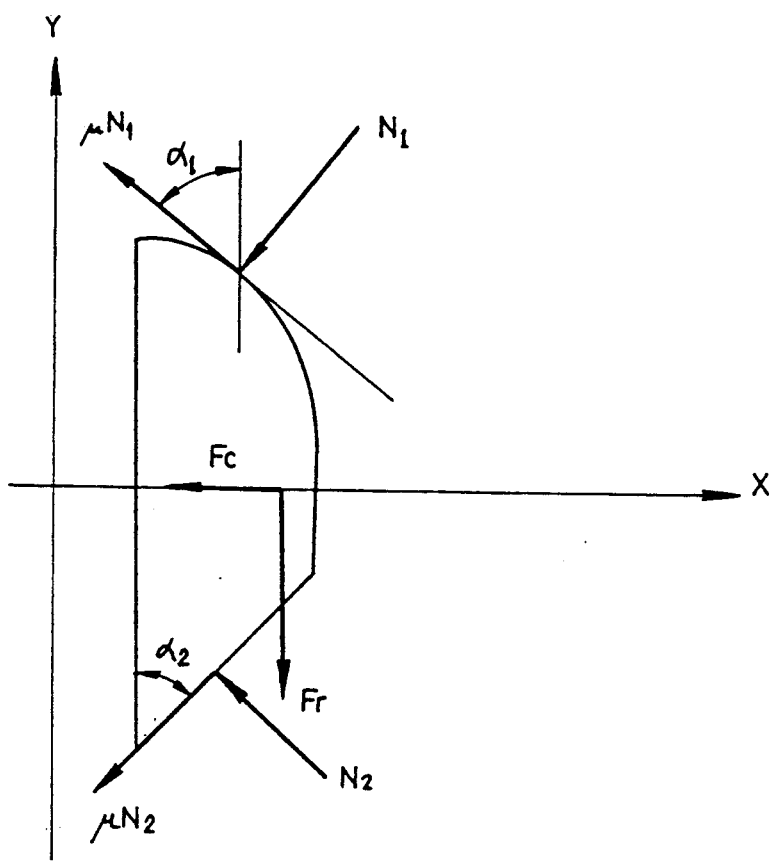

FIG. 6c gives the diagram of the block of the forces acting on the radially free centrifugal block wherein the variables shown are defined as follows:

$F_R$: Force acting on the belt (resultant)

$F_C$: Centrifugal force $= -3M\omega^2 R$ where $R = x_o + \Delta x$

Ni: Reaction of the centrifugal forces at the points of contact ai: Angle at the point of contact.

μ: Coefficient of friction on the sliding plane.

It is by the modification of the shape of the sliding planes (cam surfaces) that a rough adjustment may be carried out for the type of motor connected with the application under consideration (electric or gas motor or diesel motor).

By changing, in accordance with the above mathematical considerations, the mass of the movable center, it is possible to obtain an adjustment of the transmission which is directly related to the power of the motor. This is what makes adjustments of a transmission made according to the invention simple.

It should be noted here that calculating, in the manner shown above, the cam surface of the reaction cup and the shape of the end edges of the centrifugal blocks, the latter is made to slide along a surface portion that increases from start-up to cruising speed of the transmission, as can be seen in FIGS. 2 and 3.

I claim:

1. A variable speed transmission of the type comprising:

a pulley having a pair of side cheeks rotatable in unison about a common axis and defining a V groove between them for receiving a drive belt, one of said cheeks being axially stationary and the other being axially movable;

an axially stationary rotatable reaction cup located on the side of said pulley away from said stationary cheek;

said movable cheek and said reaction cup each being formed with a cam surface extending around said common axis, said cam surfaces converging toward one another and defining a chamber between them;

a plurality of centrifugal weights disposed in said chamber for free displacement thereof radially away from said common axis as said pulley rotates; said weights being elongated in a direction parallel to said common axis and being formed with end edges slidable on said cam surfaces whereby, as said pulley rotates, said weights are thrown outward from said common axis and thereby bias said movable cheek toward said stationary cheek;

the improvement wherein said cam surfaces of said reaction cup is concave with respect to said common axis, having a radius of curvature of predetermined length, and said end edges of said weights, slidable on said reaction cup, are convex on at least a portion of the radial thickness of said weights; said convex portions having a radius of curvature shorter than said pr determined length;

said cam surface and said end edges being calculated so that said end edges slide on said cam surface along a surface portion thereof that increases between start-up and cruising speed.

2. A transmission as claimed in claim 1 wherein said end edges of said weights slidable on said reaction cup are convex along the full radial thickness of said weights.

3. A transmission as claimed in claim 1, wherein said convex portions are rounded bulges at the center of said end edges slidable on said reaction cup.

4. A transmission as claimed in claim 1, wherein said common axis is the longitudinal axis of a central hub of said stationary cheek and said reaction cup is removably secured at the free end of said hub.

5. A transmission as claimed in claim 4, wherein said movable cheek has a central sleeve coaxial with and mounted over said hub to extend into said chamber, means being provided on said hub and on said sleeve for allowing said sleeve to rotate in unison with said stationary cheek and to slide over said hub.

6. A transmission as claimed in claim 5, including resilient means biasing said movable cheek axially away from said stationary cheek.

7. A transmission as claimed in claim 6, wherein said resilient means comprise: radial shoulders formed on said sleeve and on said hub and a coil spring wound around said hub and having ends abutting said shoulders, respectively.

8. A transmission as claimed in claim 7, wherein said end edges of said weights slidable on said reaction cup are convex along the full radial thickness of said weights.

9. A transmission as claimed in claim 8, wherein said convex portions are rounded bulges at the center of said end edges slidable on said reaction cup.

10. A transmission as claimed in claim 4, wherein said cam surface of said movable cheek is a frusto-cone and said end edges of said weights slidable on said movable cheek define frusto-conical sections capable of being flatly applied against said movable cheek cam surface.

11. A transmission as claimed in claim 10, including rib means projecting from said frusto-cone of said movable cheek, said rib means defining channels guiding said centrifugal weights during their radial displacement.

12. A transmission as claimed in claim 10 wherein said end edges of said weights slidable on said reaction cup are convex along the full radial thickness of said weights.

13. A transmission as claimed in claim 10, wherein said convex portions are rounded bulges at the center of said end edges slidable on said reaction cup.

14. A transmission as claimed in claim 6, wherein said sleeve has two spaced apart ends and said means allowing said sleeve to slide over said hub includes axial bearings positioned at both of said spaced apart ends.

* * * * *